(12) United States Patent
McMahon et al.

(10) Patent No.: US 8,943,543 B2
(45) Date of Patent: Jan. 27, 2015

(54) SYSTEM AND METHOD BRIDGING CLOUD BASED USER INTERFACES

(71) Applicant: Charter Communications Operating, LLC, St. Louis, MO (US)

(72) Inventors: Michael Donovan McMahon, Centennial, CO (US); David James Colter, Littleton, CO (US); Douglas Masaru Ike, Denver, CO (US)

(73) Assignee: Charter Communications Operating, LLC, St. Louis, MN (US)

( * ) Notice: Subject to any disclaimer, the term of this patent is extended or adjusted under 35 U.S.C. 154(b) by 0 days.

(21) Appl. No.: 13/963,594

(22) Filed: Aug. 9, 2013

(65) Prior Publication Data

US 2014/0047484 A1  Feb. 13, 2014

Related U.S. Application Data

(60) Provisional application No. 61/681,253, filed on Aug. 9, 2012.

(51) Int. Cl.
*H04N 21/482* (2011.01)
*H04N 21/431* (2011.01)

(52) U.S. Cl.
CPC .......... *H04N 21/482* (2013.01); *H04N 21/431* (2013.01)

USPC .............................................. 725/61; 725/37

(58) Field of Classification Search
USPC ......... 725/37, 60, 61, 86, 100, 114, 117, 131, 725/133, 135, 138, 139, 141, 143, 144, 147, 725/151, 153
IPC ....................... H04N 5/445,7/173, 7/16, 21/482
See application file for complete search history.

(56) References Cited

U.S. PATENT DOCUMENTS

| | | |
|---|---|---|
| 2008/0101466 A1 | 5/2008 | Swenson et al. |
| 2009/0178063 A1 | 7/2009 | Maffeis |
| 2010/0333150 A1 | 12/2010 | Broerman et al. |
| 2012/0192234 A1 | 7/2012 | Britt et al. |

OTHER PUBLICATIONS

The International Search Report and the Written Opinion of the International Searching Authority, or the Declaration in PCT/US13/54377, Charter Communications Operating, LLC, Applicant, mailed Nov. 8, 2013, 11 pages.

*Primary Examiner* — Sherrie Hsia
(74) *Attorney, Agent, or Firm* — Wall & Tong, LLP (57) ABSTRACT

Systems and apparatus providing UI functionality at a client device via a video decoder/renderer operates to decode a compressed video stream bearing UI imagery and a messaging proxy is adapted to process user interaction data indicative of a local function to invoke an application programming interface (API) associated with the local function in order to select an appropriate channel of the decoded compressed video stream.

20 Claims, 7 Drawing Sheets

SYSTEM AND METHOD BRIDGING CLOUD BASED USER INTERFACES

FIELD OF THE INVENTION

The invention relates to the user interfaces (UIs) and, more particularly but not exclusively, server-centric UIs adapted to efficiently process clickstream data indicative of local functions.

BACKGROUND

Network operators such as cable television operators use various information distribution systems to deliver television, video on demand (VOD) and other video related services to subscribers via set-top terminals (STTs) or set-top boxes (STBs). For STBs having differing levels of capability (e.g., a heterogeneous system), possibly from different manufacturers, user interface (UI) look and feel, functionality and the like provided via one model (e.g., a high capability STB) may be different than that provided by another model (e.g., a low capability STB). As such, there may be poor consistency of user experience across the operator's subscriber footprint.

Network operators may achieve a consistent user interface by deploying additional applications or widgets with UI functionality using application environments such as OCAP (OpenCable Application Platform), Tru2way interactive digital cable services, EBIF (Enhanced TV Binary Interchange Format), ACAP (Advanced Common Application Platform), MHP (Multimedia Home Platform) and the like. Full program guides have been implemented that are Java-based and remain as large downloaded and installed files at the STB (which necessarily requires significant STB memory and processing resources).

Disadvantageously, these UIs are implemented as add-on features rather than viable avenues to fully replicate a TV guide, video on demand navigation system, DVR management screen and the like. Further, it is likely that older STBs will not be able to support such a deployment.

Network operators may achieve a consistent user interface by encoding still or moving UI imagery within an MPEG video stream, where key presses are relayed to a server for processing, and changes in the UI are rendered through changes in the imagery provide via the MPEG stream. These systems depend on a UI client application resident at the STB which relays the key strokes to the server and is responsible for communicating with an underlying (traditional) program guide in order to provide channel tune commands, DVR related commands, video on demand requests and the like.

Disadvantageously, this type of solution still requires a traditional guide and, in fact, is dependent on that guide for some of the basic TV functions such that the limitations of existing guides are not circumvented (e.g., if the existing guide does not expose APIs for listing DVR assets, then the UI client application will not have access to them). Some traditional guide screens will need to be forced to display where the traditional guide requires control (e.g., parental controls entry, video on demand purchase confirmations and the like). Further, for STBs without broadband connections (e.g., embedded cable modems), the upstream traffic generated by the UI client application sending key presses to the server creates significant network contention on the cable plant. It is also noted that the unicast nature of this type of UI implementation does not scale well.

SUMMARY

Various deficiencies in the prior art are addressed by systems, apparatus and methods providing UI functionality at a client device via a messaging proxy adapted to cooperate with video decoder/renderer. The video decoder/renderer operates to decode a compressed video stream bearing UI imagery to provide corresponding video streams or signals suitable for use by a presentation device. The messaging proxy is adapted to process tuner commands, DVR commands and/or other commands in response to user interaction with presented UI imagery such that local functions may be implemented without server interaction.

BRIEF DESCRIPTION OF THE DRAWING

The teachings of the present invention can be readily understood by considering the following detailed description in conjunction with the accompanying drawing, in which.

To facilitate understanding, identical reference numerals have been used, where possible, to designate identical elements that are common to the figures.

DESCRIPTION

The various embodiments provide user interfaces (UIs) served from remote elements in a network, such as a cable network head end, service provider server (generically "the cloud"), which allow cable television operators and other network operators to deliver robust content, features and services quickly and easily to both next generation set-top boxes and existing set-top boxes so that users of both types of set-top boxes are provided with a consistent user experience. Thus, while the invention will be primarily described within the context of a heterogeneous interactive information distribution system, it should be noted that the invention may be advantageously adapted to any system including information receivers, STBs, STTs and the like requiring a user interface (UI) function such as a digital television electronic programming guide (EPG), video on demand (VOD) client, digital video recorder (DVR) and the like.

Generally speaking, various embodiments provide UI functionality at a client device via a messaging proxy adapted to cooperate with video decoder/renderer. The video decoder/renderer operates to decode a compressed video stream bearing UI imagery to provide corresponding video streams or signals suitable for use by a presentation device. The messaging proxy is adapted to process tuner commands, DVR commands and/or other commands in response to user interaction with presented UI imagery such that local functions may be implemented without server interaction.

Various embodiments of the image may be implemented within the context of a standard definition STB, high definition STB, DVR, a set-top terminal with or without a broadband connection, and messaging proxy from MPEG UI to operating system (OS), an OS abstraction mechanism, one or more dedicated sockets for external systems, a state or usage reporting mechanism, a cache, programmatic merging of Quadrature Amplitude Modulated (QAM) video and MPEG UI or other UIs, and so on.

While generally described with respect to MPEG video encoding and packet transport formats and the like, it will be appreciated by those skilled in the art that other video encoding and/or transport formats may be utilized within the context of the various embodiments.

Any of the various embodiments discussed herein may be implemented within the context of an information distribution system such as a telecommunications, cable television, satellite or other network adapted according to the embodiments, a system according to any of the embodiments, hardware and/or software according to any of the embodiments, a set-top box and related server/transport entities according to any of the embodiments and so on.

Figure 1:
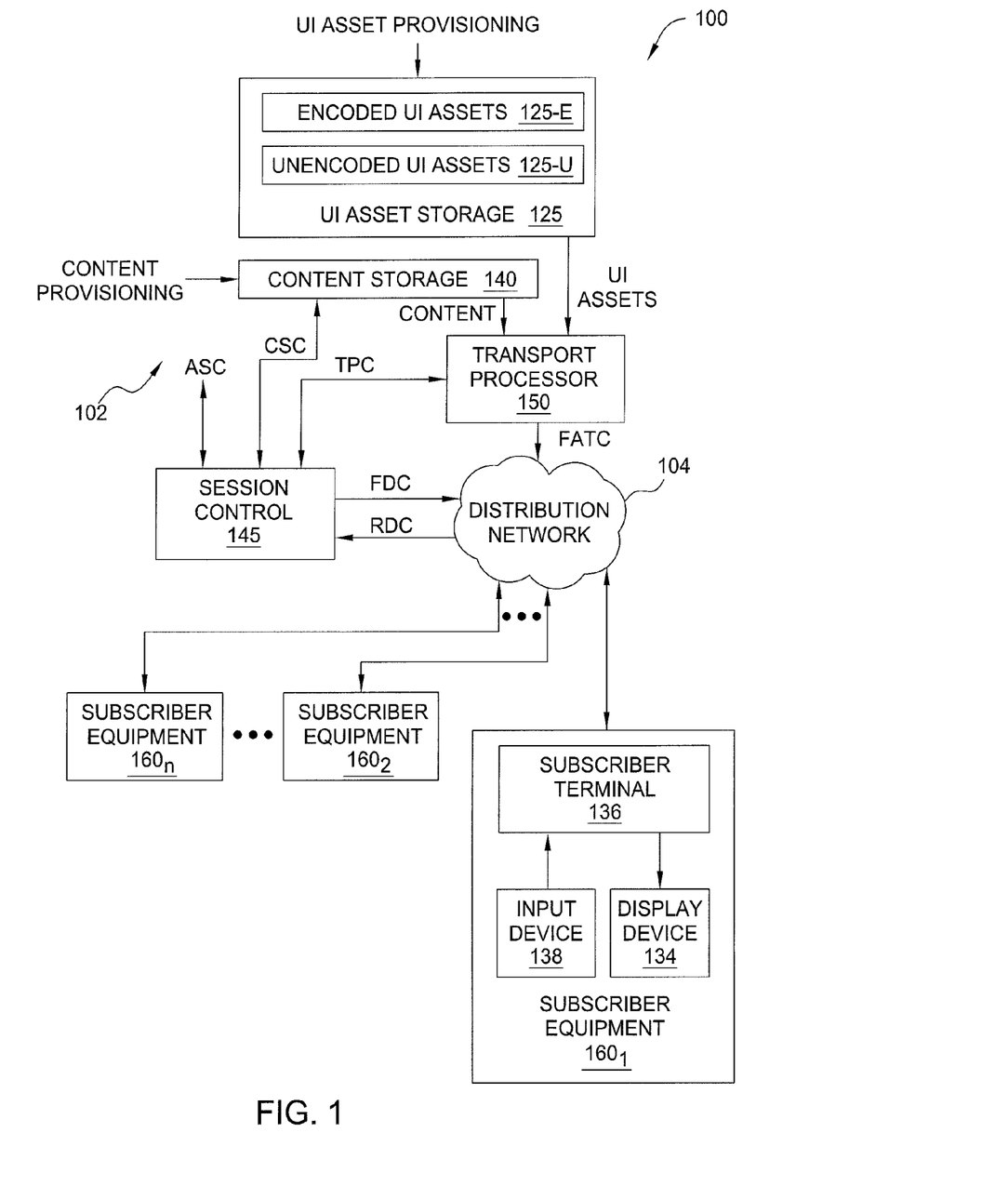
FIG. 1 depicts a high-level block diagram of an interactive information distribution system.

FIG. 1 depicts a high-level block diagram of an interactive information distribution system. Specifically, FIG. 1 depicts a high-level block diagram of an interactive information distribution system 100 capable of supporting various embodiments of the present invention. The system 100 contains service provider equipment 102, a distribution network 104 and subscriber equipment 106.

The system 100 of FIG. 1 is depicted as a heterogeneous system in that subscriber equipment 106 may comprise subscriber terminals, also known as set-top terminals (STTs) or set-top boxes (STBs), of differing capability with respect to control processing, bandwidth and/or graphics processing; generally speaking, differing capabilities in terms of processing resources and memory resources. However, subscriber equipment 106 capable of implementing the various embodiments described herein includes a basic or minimal level of functionality, such as an ability to decode an MPEG-2 transport stream including video information (and associated audio information) and process the decoded video (and associated audio information) to produce video (and audio) streams or signals suitable for use by a presentation device.

The distribution network 104 may comprise one or more of a Hybrid Fiber Coax (HFC) for cable, optical network, IP network, Plain Old Telephone System (POTS) for ADSL, terrestrial broadcast system like MMDS or LMDS, or satellite distribution system like DBS.

The service provider equipment 102 comprises a user interface (UI) asset storage module 125, a content storage module 140, a session controller 145 and a transport processor 150.

The UI asset storage module 125 is used to store UI assets such as encoded UI assets 125-E or unencoded UI assets 125-U. The encoded UI assets 125-E may comprise still or moving UI imagery (e.g., UI screens) encoded according to MPEG or other video encoding formats. The UI assets may be stored in several forms, such as unencoded, encoded and but not transport packetized, encoded and transport packetized and the like. In various embodiments, the UI assets are stored as transport packets according to a specific protocol, such as MPEG-2 transport packets. In this manner transport encoded UI asset packets may be easily multiplexed into a transport stream being formed.

The content storage module 140 is used to store content such as movies, television programs and other information offerings. The content may be stored in several forms, such as unencoded, encoded and but not transport packetized, encoded and transport packetized and the like. In various embodiments, the content is stored as transport packets according to a specific protocol, such as MPEG-2 transport packets. In this manner transport encoded content may be easily multiplexed into a transport stream being formed.

The transport processor 150 combines or multiplexes content and/or UI asset data as needed to provide an output data stream for transmission to a subscriber via a forward application transport channel (FATC) within the distribution network 104. In various embodiments, the transport processor 150 performs transport packetizing functions for content and/or UI asset data as needed in conformance with the FATC transport protocols. In various embodiments, the transport processor 150 also performs video encoding functions such as MPEG encoding of unencoded UI assets.

The session controller 145 (or session manager) provides session control of the information flowing to and from the UI asset storage module 125 and content storage module 140. The session controller 145 provider controls communications between the server equipment 102 and subscriber equipment 106, such as between a cable system head-end and one or more set-top terminals. The session controller 145 produces an asset storage control signal ASC for controlling and communicating with the UI asset storage module 125, a content storage control signal CSC for controlling and communicating with the content storage module 140, and a transport processor control signal TPC for controlling and communicating with the transport processor 150.

The session controller 145 sends data, such as commands, encryption keys and the like to subscriber equipment 106 via a forward data channel (FDC). The session controller 145 receives subscriber equipment data, such as information stream requests, session initiation data (set-top identification, capability, and the like), user clickstream information and/or other data from subscriber equipment 106 via a reverse data channel (RDC).

The FDC and RDC are supported by the distribution network 104 and may comprise relatively low bandwidth data channels, such as 1-2 megabits per second data channels utilizing QPSK, QAM or other modulation techniques. The FDC and RDC are also known as "out of band" channels, while a relatively high bandwidth forward application transport channel (FATC) is also known as an "in-band" channel. In various embodiments, the session controller 145 contains interface devices for sending control information via the forward data channel FDC and receiving control information via the reverse data channel RDC using so-called "out of band" carrier frequencies.

The distribution network 104 can be any one of a number of conventional broadband communications networks that are available such as a fiber optic network, a telecommunications network, a cable television network and the like. In various embodiments, distinct FATC, FDC and RDC channels are not used. For example, in various embodiments the distribution network 104 may comprise an IP network that may include more than one access network, may traverse core Internet networks, may traverse third-party networks and so on.

The transport processor 150 provides various forward content channel transmission interface functions of the system 100 of FIG. 1. Specifically, the transport processor 150 is coupled to subscriber equipment via the forward applications transport channel (FATC). In various embodiments, the forward application transport channel (FATC) is supported by the distribution network 104 and comprises a relatively high bandwidth communications channel well suited to carrying video, audio and data such as, for example, multiplexed MPEG-2 transport packets. It should be noted that data normally conveyed to a set-top box via the FDC may be included in the FATC data stream.

The transport processor 150 contains a multiplexer or combiner for multiplexing or combining the content information stream CONTENT provided by content storage module 140 and the asset information stream ASSETS provided by asset storage module 125.

The subscriber equipment 106 comprises, illustratively, a subscriber terminal 136, display device 134 and input device 138. The subscriber terminal 136 may comprise a set-top terminal, set-top box, communications terminal, computer, smartphone and/or other device capable of interacting with the service provider equipment 102 via the distribution network 104. The display device 134 may comprise any display device, such as a conventional television, computer monitor, the computer display, a smart phone display and so on. The input device 138 may comprise any input device, such as a remote control, a keyboard, a touch screen device and so on. Generally speaking, the subscriber terminal 136 receives from the input device 138 data indicative of user interaction with the input device 138. Generally speaking, the subscriber terminal 136 provides presentation signals of still or moving imagery suitable for presentation via the display device 134.

Figure 2:
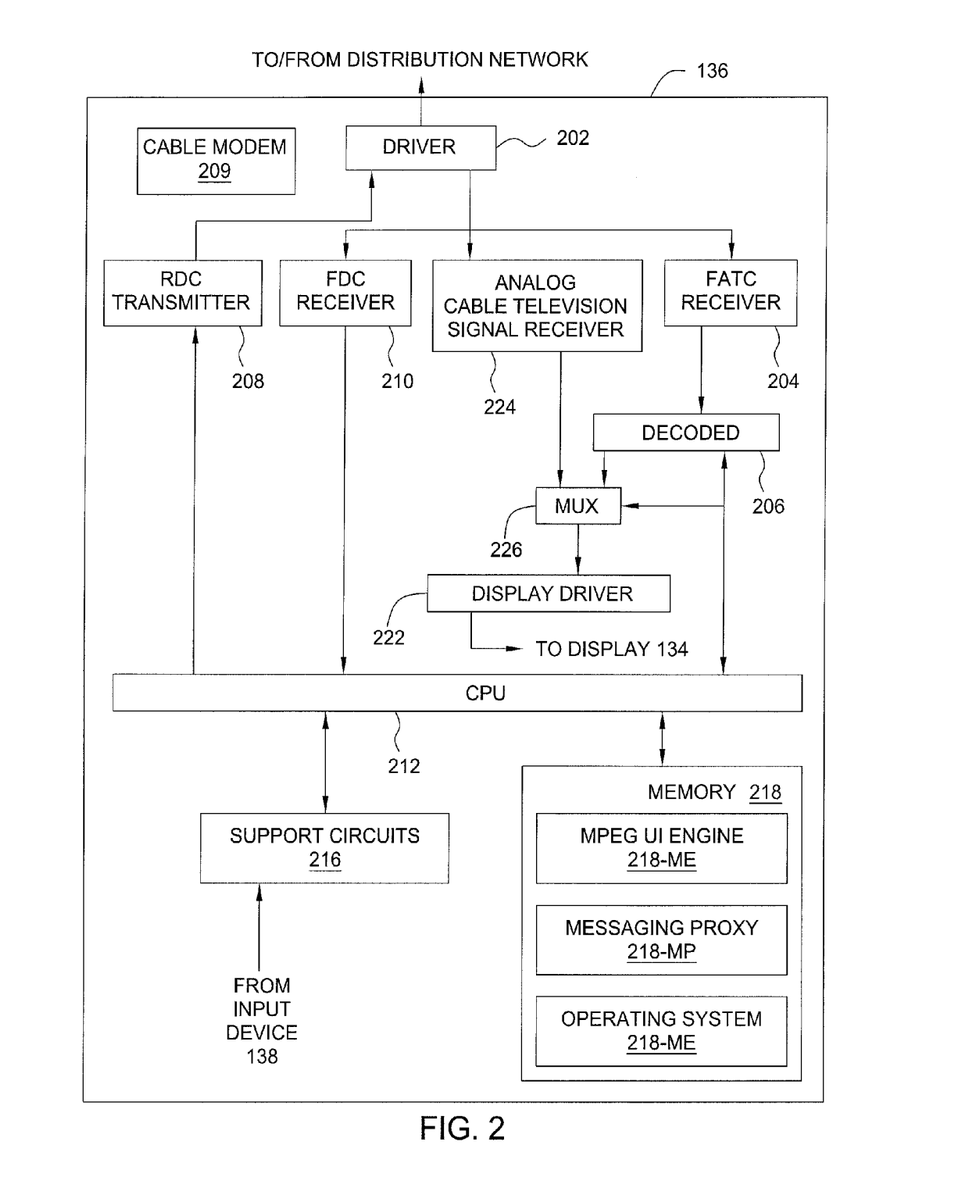
FIG. 2 depicts a high level block diagram of a subscriber terminal suitable for use in the interactive information distribution system of FIG. 1.

FIG. 2 depicts a high-level block diagram of an exemplary subscriber terminal suitable for use in the interactive information distribution system of FIG. 1. Specifically, FIG. 2 depicts a high level block diagram of a subscriber terminal 136 comprising a diplexer 202, a back channel (RDC) transmitter 208, an information channel (FATC) receiver 204, a command channel (FDC) receiver 210, an information decoder (e.g., MPEG decoder) 206, a conventional television signal receiver 224, a multiplexer 226, a display driver 222, various support circuits 216, a processor 212 and memory 218. In various embodiments, the subscriber terminal 218 includes a cable modem 209 operative to communicate with a broadband connection (not shown) to thereby implement various functions associated with the RDC, FDC and/or FATC.

The diplexer 202 couples the (illustrative) three channels of the distribution network carried by a single cable to the transmitter 208 and receivers 204 and 210.

Each receiver 204 and 210 contains any necessary tuners, amplifiers, filters, demodulators, depacketizers, decoders and so on, to tune, downconvert, and depacketize and otherwise retrieve the signals from the distribution network. The information channel receiver 204 may contain a conventional "in-band" QAM demodulator or other appropriate high-bandwidth demodulator. Control channel receiver 210 may comprise an "out-of-band" QPSK demodulator for handling command channel data carried by the forward data channel.

The decoder 206 processes data packets carrying information provided by the QAM demodulator to provide useable signals for the display device 134 or other presentation device or recording device. The decoder 206 operates to decode audiovisual streams such as compressed elementary video streams, MPEG video streams, MPEG-2 transport streams and so on as appropriate. The decoder 206 is in communication with and controlled by the controller 212.

The conventional cable television signal receiver 224 contains a tuner and conventional analog television demodulator, illustratively an NTSC, PAL or SECAM demodulator.

The multiplexer 226 selectively couples the demodulated analog television signal from the television signal receiver 224 or the decoded video signal from the decoder 206 to the display drive 222, which conventionally processes the selected signal to produce a presentation or video signal suitable for use by, illustratively, the display device 134. The multiplexer 226 is in communication with and controlled by the controller 212.

Thus, each subscriber terminal 136 receives data streams from the FATC or FDC, demodulates the received data streams and, in the case of video streams, decodes or otherwise processes the demodulated video streams to provide video presentation streams suitable for use by display device 134. In addition, the subscriber terminal 136 accepts commands from the remote control input device 138 or other input device. These commands are formatted, modulated, and transmitted through the distribution network 104 to the session controller 145. This transmission may be propagated via the RDC, though any communication channel capable of propagating data to the service provider equipment 102 may be used. Subscriber terminal 136 for different subscriber equipment 106 may vary in the format of encoding and/or transport protocol supporting, such as supporting one or more of MPEG-2, MPEG-4, DVB and/or other encoding or transport protocols.

Within the set-top terminal 136, the controller 212 is supported by memory 218 and various support circuits 216 such as clocks, a power supply, an infrared receiver and the like. The memory 218 is depicted as including various program modules, including MPEG UI engine 218-ME, a messaging proxy 218-MP and an operating system 218-OS. The operation of these various program modules will now be described with respect to an MPEG UI generation function.

Thin Message Marshaling Proxy

Figure 3:
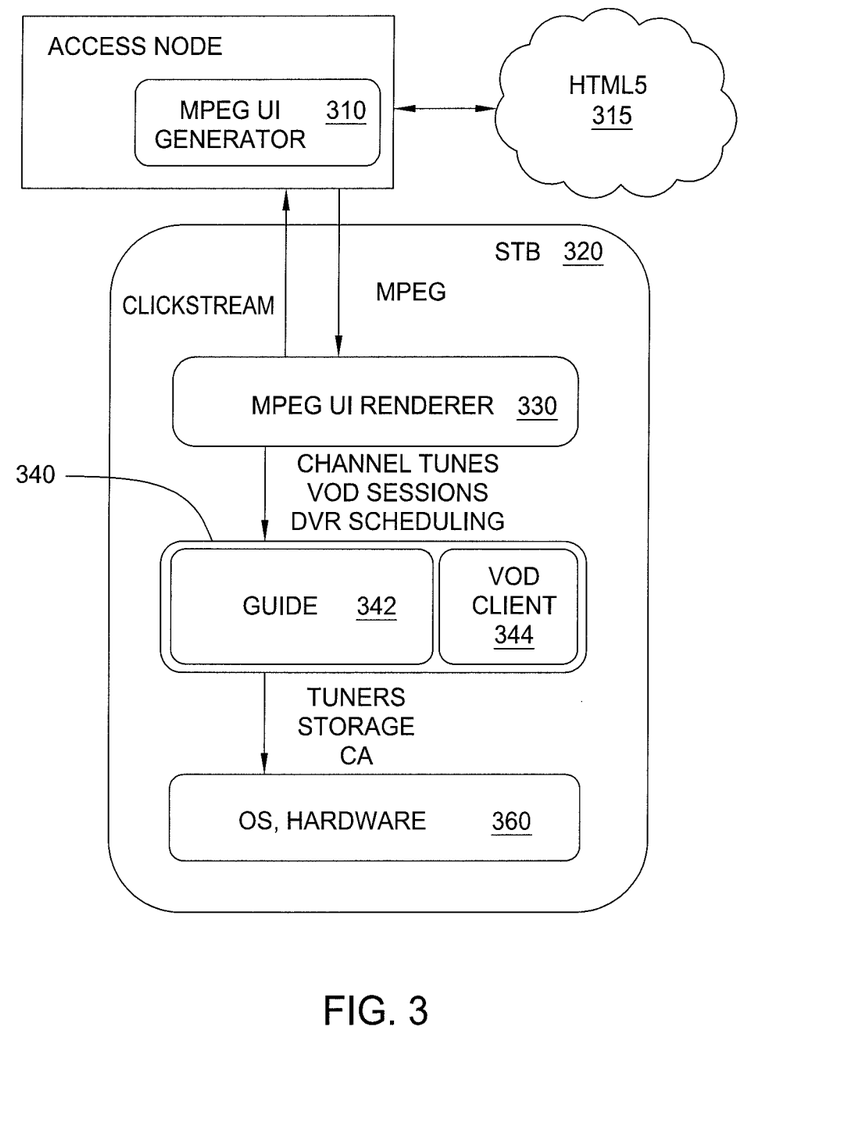
FIG. 3 graphically depicts a functionally bifurcated user interface structure according to one embodiment.

FIG. 3 graphically depicts a functionally bifurcated user interface structure according to one embodiment. Specifically, FIG. 3 depicts a UI in which a server provides UI imagery to the client via encoded video streams, receives clickstream data associated with user interaction at the client and adapts the served UI imagery and provides server-side services to the client in response to the clickstream data. A client-side messaging proxy identifies and acts upon clickstream data associated with local client functions via APIs that hook into the local OS of the client, illustratively a STB.

FIG. 3 depicts an MPEG user interface (UI) generator 310 in communication with a network 315 and a set-top box (STB) 320.

The MPEG UI generator 310 may be located or operational at a service provider access node associated with the STB 320, some other access node, a node within the network 315, a remote server, a UI vendor system, a cable television network head end and the like. For example, in various embodiments, the MPEG UI generator 310 is implemented at the session controller 145 or other elements within the service provider equipment 102 discussed above with respect to the system 100 of FIG. 1.

The STB 320 may comprise an STB or other device or module capable of decoding/processing MPEG transport streams and the like, perhaps an STB having a relatively limited graphical user interface (GUI) capability. For example, in various embodiments, the STB 320 comprises a subscriber terminal 136 such as discussed above with respect to the subscriber equipment 106 of the system 100 of FIG. 1.

It should be noted that the various embodiments described herein are generally described within the context of the various MPEG-related or MPEG-like audiovisual compression and/or transport processing standards and protocols. However, various embodiments are adapted to use other audiovisual compression and/or transport processing standards and protocols, such as those associated with the Digital Video Broadcasting (DVB), Integrated Services Digital Broadcasting (ISDB), Advanced Television Systems Committee (ATSC) and so on.

Generally speaking, the UI generator 310 receives click stream and/or other information from the STB 320 indicative of user interaction with the user interface. In response to the click stream information, the UI generator 310 communicates with various network elements (not shown in FIG. 3) within the network 315 (illustratively, an HTML 5 compliant network) to retrieve appropriate imagery therefrom, which imagery is then adapted by the UI generator 310 for subsequent use by the STB 320. In particular, the MPEG UI generator 310 converts still or moving imagery received from the network 320 into MPEG-compliant imagery for propagation toward a STB.

MPEG-encoded or compliant UI imagery provided by the MPEG UI generator 310 (as well as other data streams) is processed by a MPEG UI renderer 330 at the STB 320 to provide thereby streaming video, audio, data and the like for presentation. In various embodiments, channel tuning data, video on demand (VOD) session data, digital video recorder (DVR) scheduling data and the like may be communicated between the STB 320 and UI generator 310 via the click stream (upstream) path, MPEG transport channel (downstream) path or other paths. For example, in various embodiments the STB may include a Data Over Cable Service Interface Specification (DOCSIS) or other modem capability (not shown) adapted for communicating data to/from the STB.

In various embodiments, the UI renderer is implemented using MPEG demux/decode capabilities resident or otherwise implemented at the STB 320. In various embodiments, the UI renderer is implemented using MPEG demux/decode capabilities outside of the STB 320.

Data extracted by the UI renderer 330 is further processed by one or both of a guide program 340 and VOD client 350. These entities provide resulting tuner, storage and other information to the underlying operating system (OS) and hardware 360 of the STB 320.

Generally speaking, embodiments described herein with respect to FIG. 3 may be conceptualized as a "guide without a guide" in that the entirety of the user interface is rendered via MPEG (more generally, compressed video including still or moving UI imagery). In this manner, the bloat and complexity of the traditional user interface is removed from the set-top box and replaced with a thin layer with the sole purpose of acting as a proxy between MPEG user interfaces and the underlying OS for relaying tuner and DVR commands.

Figure 4:
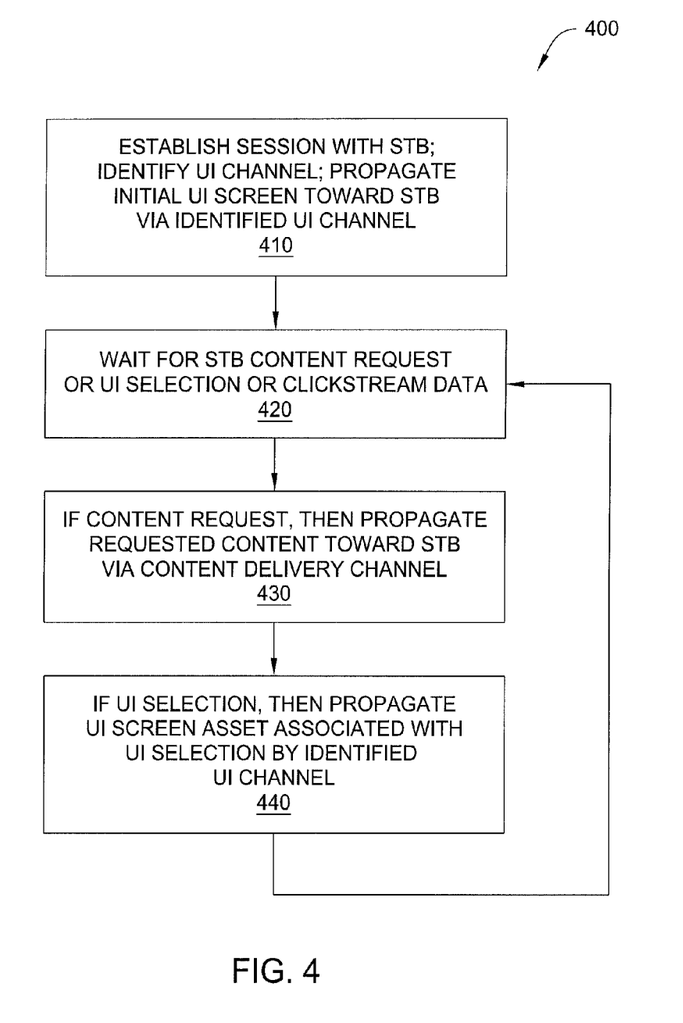
FIG. 4 depicts a flow diagram of a method suitable for use at a service provider.

FIG. 4 depicts a flow diagram of a method suitable for use at a service provider. Specifically, FIG. 4 depicts a flow diagram of a method suitable for use at an MPEG UI generator, such as described herein with respect to the various figures. For example, the method 400 of FIG. 4 may be implemented at, illustratively, the session controller 145 of FIG. 1, the MPEG UI generator 310 of FIG. 3 and so on. The method 400 is adapted for providing UI screens via one or more selected video channels, such as video channels propagated toward a STB.

At step 410, the MPEG UI generator establishes a session with an STB, identifies a specific channel within a plurality of video channels provided to the STB as a UI channel, and propagates one or more initial UI screen assets towards the STB via the identified UI channel. The UI screen assets are adapted to be decoded at the STB to produce a video presentation stream suitable for use by, illustratively, a display device.

At step 420, the MPEG UI generator waits to receive an STB content request or UI selection or clickstream data generated by, illustratively, a STB of other client device. In various embodiments, clickstream data associated with a local client function will have been processed by a message proxy or other entity at the client. In these embodiments, the local client function clickstream data may be ignored from a functional perspective, though the data may be useful for subscriber management, demographic profiling, usage statistics and the like. In various embodiments, clickstream data associated with a local client function may have been omitted from the clickstream data provided by the client device. In various embodiments, a flag or indicator is associated with local client function of extreme data such that it can be readily identified as such.

At step 430, if an STB content request is received by the MPEG UI generator, then the requested content is propagated toward the STB via a content delivery channel. For example, if the method 400 is implemented using session manager 145, then the session manager 145 causes the content storage module 142 begin streaming the requested content to the STB via the transport processor 150 and distribution network 104. The method 400 is implanted using an access node or other network element, then the access node or other network element forwards the content request to an appropriate content request fulfillment elements, such as a session manager, content server and the like.

At step 440, if data indicative of a UI selection is received by the MPEG UI generator, then the UI screen assets associated with the UI selection data are propagated toward the STB via the identified UI channel. For example, if the method 400 is implemented using session manager 145, then the session manager 145 causes the UI asset storage module 125 to stream the appropriate UI screen asset (or assets) to the STB via the transport processor 150 and distribution network 104.

The method 400 then waits for a next content request or UI selection. At any time, the MPEG UI generator, session manager or other entity may change the identified UI channel. In this case, at least that portion step 410 associated with identifying the UI channel to the STB is repeated.

The method 400 generally provides for an MPEG UI generator in which initial and subsequent UI assets are streamed to an STB via a designated UI channel in response to data indicative of a user interaction or selection of the UI screen represented by the initial or subsequent UI assets.

Figure 5:
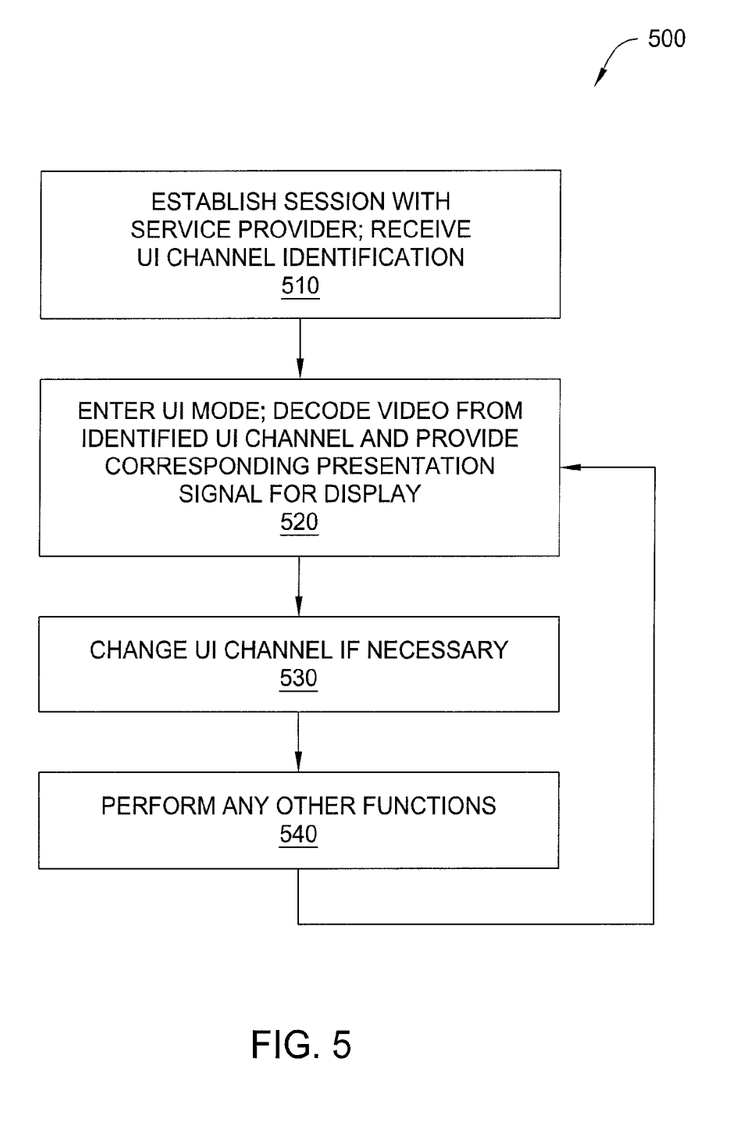
FIG. 5 depicts a flow diagram of a method suitable for use at a UI renderer at a client device.

FIG. 5 depicts a flow diagram of a method suitable for use at a UI renderer at a client device. Specifically, FIG. 5 depicts a flow diagram of a method suitable for use at an MPEG UI renderer, such as described herein with respect to the various figures. For example, the method 500 of FIG. 5 may be implemented at, illustratively, the subscriber terminal 136 of FIG. 1, the MPEG UI renderer 330 of FIG. 3 and so on. The method 500 is adapted for decoding received UI assets to produce a video presentation stream suitable for use by, illustratively, a display device.

At step 510, the MPEG UI renderer establishes a session with the service provider and receives channel identification information associated with a channel to be used as a UI channel.

At step 520, the MPEG UI renderer enters a UI mode in which UI assets and the like received via the identified UI channel are decoded to produce a video presentation stream for subsequent display. For example, initial UI screen assets transmitted at step 410 of the method 400 are received at step 520 of the method 500, where the received assets are decoded and used to provide initial UI imagery on a display device for viewing by a user.

At step 530, the UI channel is changed if necessary, such as in response to a command received from the MPEG UI generator, session manager 145 or other network entity.

At step 540, any other functions to be performed by the UI renderer are performed, such as those noted below with respect to FIG. 6. For example, in various embodiments, the conditional UI rendering is provided wherein the UI renderer is responsive to the messaging proxy, and the message proxy causes various modifications to UI rendering operations in response to certain conditions (e.g., client device memory or processor resource conditions, subscriber level, subscriber authorization termination and so on). The method 500 may be continually repeated.

Figure 6:
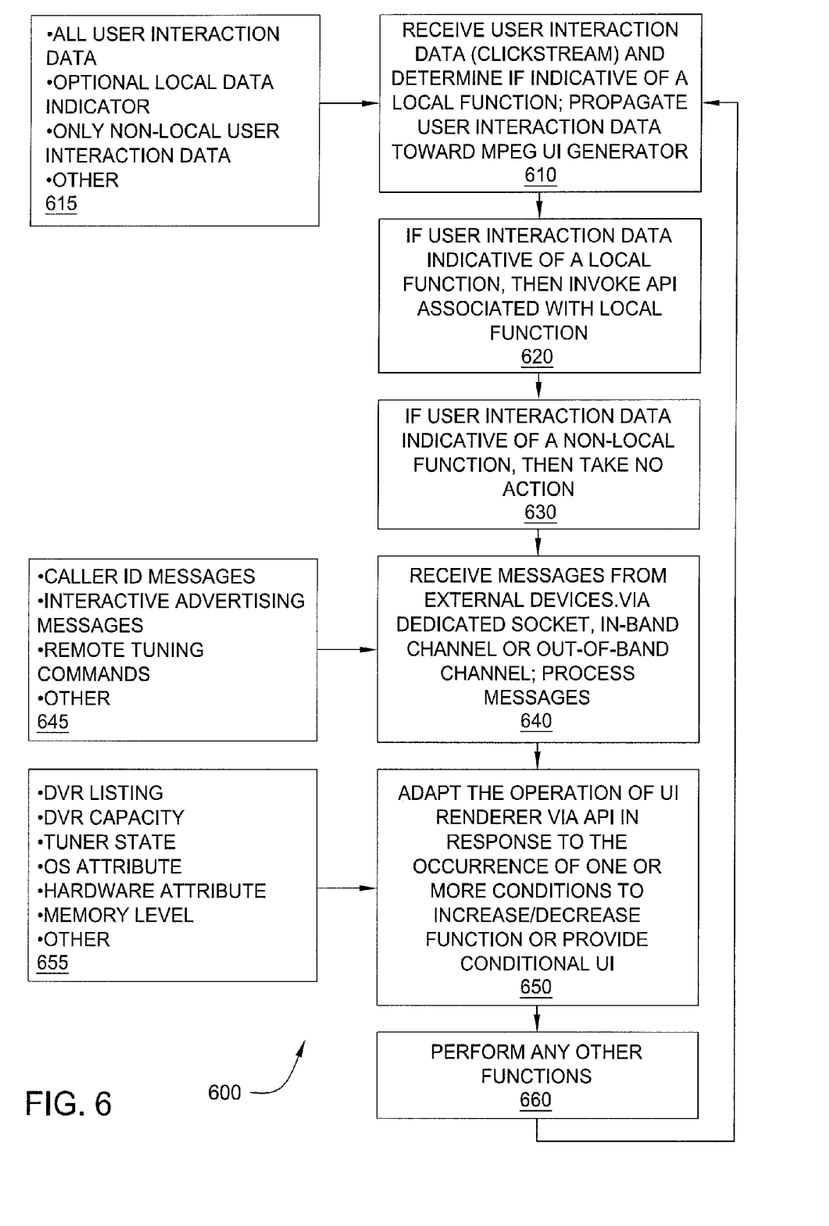
FIG. 6 depicts a flow diagram of a method suitable for use at message proxy at a client device.

FIG. 6 depicts a flow diagram of a method suitable for use at message proxy at a client device. Specifically, FIG. 6 depicts a flow diagram of a method suitable for use at message proxy, such as described herein with respect to the various figures. For example, the method 600 of FIG. 6 may be implemented at, illustratively, the subscriber terminal 136 of FIG. 1, the message proxy 340 of FIG. 3 and so on. The method 600 is adapted for propagating clickstream data toward the MPEG UI generator, invoking local APIs into the STB OS to invoke local functions selected by a user interacting with the STB, and performing other functions as needed according to the various embodiments.

At step 610, the message proxy receives user interaction data (i.e., clickstream data) any terms if the received data is indicative of a local function, such as a channel tuning function, a local VOD session function, a local DVR scheduling function and the like. In addition, the clickstream data is propagated toward the MPEG UI generator, session manager or other service provider equipment entity. Referring to box 615, all of the user interaction data may be propagated (with or without an optional local data indicator included within the propagating clickstream), only non-local user interaction data may be propagated or some commission thereof. In various embodiments, status information, performance information, error codes and the like are also propagated.

At step 620, if the user interaction data is indicative of a local function, then the application programming interface (API) associated with the local function is invoked. For example, in the case of data indicative of a local channel tuning function, the API associated with channel tuning is invoked to responsibly select the appropriate video channel (and corresponding audio channel).

At step 630, if the user interaction data is indicative of a non-local function, then no action is taken. For example, in the case of data indicative of UI manipulation requiring display of a different UI screen (e.g., a different block of channels, a different block of time etc.), there is no local action to be taken since the MPEG UI generator must perform this task. It is noted that in the method 400 discussed above with respect to FIG. 4, only STB content requests or UI selections are processed. Thus, clickstream data received by the MPEG UI generator indicative of a local STB function will be ignored as appropriate.

At step 640, in various embodiments the message proxy receives messages from external devices via a dedicated socket, an in-band channel and/or an out-of-band channel. These messages are then processed by the message proxy as appropriate. Referring to box 645, received messages may comprise caller ID messages, interactive advertising messages, remote tuning commands and/or other messages. In various embodiments the external device sending these messages comprises a mobile device such as a smart phone, tablet, laptop or other device. In various embodiments, other client devices within the same house or associate of the same subscriber may communicate such messages to the client device.

At step 650, in various embodiments the message proxy adapts the operation of the UI renderer via an API in response to the occurrence of one or more conditions to thereby increase or decrease UI function, provide a conditional UI, improve UI robustness and the like. Referring to box 655, such conditions may comprise or be related to the DVR listing, DVR capacity, tuner state, OS attribute, order attribute, memory level and/or other conditions.

At step 660, any other functions to be performed by the message proxy are performed. For example, in various embodiments the message proxy is adapted to fetch encoded UI video assets or portions thereof via a broadband connection associated with said client device. That is, in embodiments including a cable modem, fiber interface or other broadband access device, the message proxy may request the delivery of encoded UI video assets or portions thereof, as well as advertising content or other content via a broadband connection to improve overall performance of the user interface, client device and system in general. The method 600 may be continually repeated.

In various embodiments, additional capabilities are included to reduce the complexity of a set-top box needed to support the various UI features discussed herein in the following example.

In various embodiments, a thin message marshaling proxy does not include actual user interface; rather, it is instantiated at the same software layer as a traditional or underlying "guide" and is optionally provided with application programming interfaces (APIs) that extend abstractions of the hardware and OS up to the MPEG rendering component. These embodiments may include implementations within the context of DVR listings, DVR capacity, tuner state, OS/Hardware attributes, available memory and the like. These can be cleanly exposed to the MPEG UI renderer such that more robust and/or conditionally rendered user interfaces will be possible.

In various embodiments, in addition to serving as a proxy to the OS, the thin message marshaling proxy layer is implemented as one or more dedicated sockets to eliminate the need for such additional clients. It is noted that many traditional guides do not have innate or well-defined external messaging capabilities. Thus, activities such as pushing caller ID messages, interactive ads, remote tune commands from a Smartphone and so on which typically require other dedicated application environments (EBIF, etc) may be addressed as well.

It is noted that traditional program guides do not reliably report state or usage information. For example, some of these program guides collect or "batch up" DVR status information for periodic transmission to a remote server, while others rely on external monitoring applications to be built. Thus, in various embodiments, DVR status information and other status information is included within the new layer discussed herein, thereby eliminating a need for additional components and allowing operators to reliably develop cloud services. This would include harvesting DVR status or tuning activity in real time—allowing for cloud based access to DVR information from other devices, understanding of real time usage behaviors and so on.

It is noted that since a thin client has no UI of its own, it would have significantly more memory at its disposal than a traditional monolith guide. Therefore, in various embodiments, available memory is adapted to cache portions of the MPEG UI.

Within the context of mid range set-top boxes with embedded broadband connections (e.g. cable modems), a thin client according to the various embodiments is adapted to fetch the MPEG UI, portions of it or various changes via the broadband connection. In this manner, upstream contention on a cable plant may be significantly reduced.

In various embodiments, the client is adapted to reduce a bitrate of a unicast signal by programmatically merging quadrature amplitude modulated (QAM) video and the UI imagery.

In various embodiments, the client is adapted to utilize specific sockets or interfaces exposed for the purpose of providing remote diagnostics of the OS/hardware/UI of the STB.

Figure 7:
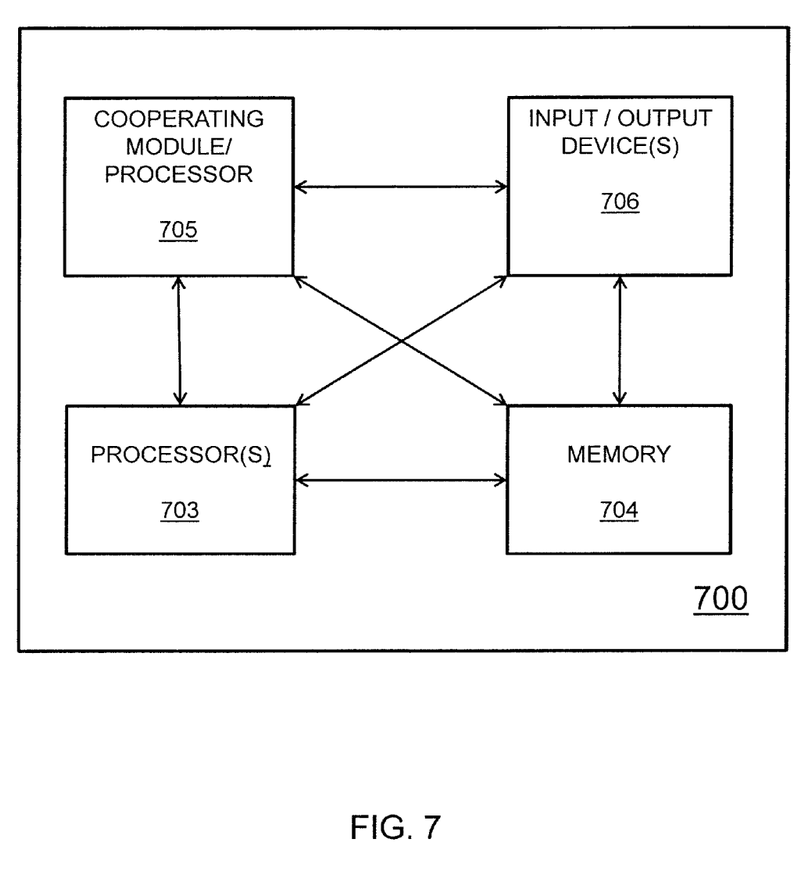
FIG. 7 depicts a high-level block diagram of a computer suitable for use in performing the functions described herein.

FIG. 7 depicts a high-level block diagram of a computing device, such as a processor in a network element, suitable for use in performing functions described herein such as those associated with the various elements described herein with respect to the figures.

As depicted in FIG. 7, computing device 700 includes a processor element 703 (e.g., a central processing unit (CPU) and/or other suitable processor(s)), a memory 704 (e.g., random access memory (RAM), read only memory (ROM), and the like), a cooperating module/processor 705, and various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 705 can be loaded into memory 704 and executed by processor 703 to implement the functions as discussed herein. Thus, cooperating process 705 (including associated data structures) can be stored on a computer readable storage medium, e.g., RAM memory, magnetic or optical drive or diskette, and the like.

It will be appreciated that computing device 700 depicted in FIG. 7 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for implementing a user interface (UI) at a client device, comprising:
   receiving encoded UI video assets via a predefined video transport channel;
   at a UI renderer, decoding said received UI video assets to produce a video presentation stream suitable for use by a display device;
   at a message proxy, in response to receiving user interaction data indicative of a local function, invoking an application programming interface (API) associated with said local function to select an appropriate channel of said video presentation stream.

2. The method of claim 1, wherein said client device comprises one of a subscriber terminal, a set-top box (STB), a set-top terminal (STT), a smart phone and a computing device.

3. The method of claim 1, wherein said encoded UI video assets are provided by a UI generator at a service provider.

4. The method of claim 3, wherein said encoded UI video assets are received via the predefined video transport channel within a service provider network.

5. The method of claim 4, wherein said predefined video transport channel is changed in response to a control signal received from the service provider.

6. The method of claim 4, further comprising propagating user interaction data not indicative of a local function toward a service provider via a back channel.

7. The method of claim 1, further comprising propagating all user interaction data toward a service provider via a back channel.

8. The method of claim 7, further comprising associating a local function indicator with user interaction data indicative of a local function propagated toward said service provider.

9. The method of claim 1, further comprising said message proxy invoking the API associated with said UI renderer to adapt the operation of said UI renderer.

10. The method of claim 9, wherein said message proxy adapts the operation of said UI renderer in response to the occurrence of one or more conditions.

11. The method of claim 10, wherein said conditions comprise any of a DVR listing, a DVR capacity, a tuner state, and operating system (OS) attribute, the hardware attribute and a level of available memory.

12. The method of claim 1, wherein the message proxy is adapted to receive messages from external devices via a socket dedicated to said message proxy.

13. The method of claim 12, wherein said messages from external devices comprise one or more of caller ID messages, interactive advertising messages and remote tuning commands, wherein said messages from external devices are pushed from a mobile communications device.

14. The method of claim 1, wherein the message proxy is adapted to receive messages from external devices via an in-band channel or an out-of-band channel.

15. The method of claim 1, wherein the message proxy is adapted to propagate state and usage information associated with said client device.

16. The method of claim 15, wherein said state and usage information includes DVR status information and channel tuning activity.

17. The method of claim 1, wherein the message proxy is adapted to fetch encoded UI video assets or portions thereof via a broadband connection associated with said client device.

18. A user interface (UI) system, comprising:
   a UI generator at an access node, for encoding UI imagery to provide an encoded video stream bearing said UI imagery;
   a UI renderer at a set-top box (STB), for decoding said encoded video stream to retrieve therefrom said UI imagery and to produce a video presentation stream suitable for use by a display device; and a message proxy at said STB, for receiving received user interaction data indicative of a local function;

wherein said message proxy, in response to receiving user interaction data indicative of a local function, invokes an application programming interface (API) associated with said local function to select an appropriate channel of said video presentation stream.

19. Apparatus including a processor configured for implementing a user interface (UI) at a client device by performing the steps of:

receiving encoded UI video assets via a predefined video transport channel;

at a UI renderer, decoding said received UI video assets to produce a video presentation stream suitable for use by a display device;

at a message proxy, in response to receiving user interaction data indicative of a local function, invoking an application programming interface (API) associated with said local function to select an appropriate channel of said video presentation stream.

20. A tangible and non-transitory computer readable storage medium storing instructions which, when executed by a computer, adapt the operation of the computer to provide a user interface (UI) method, the method comprising:

receiving encoded UI video assets via a predefined video transport channel;

at a UI renderer, decoding said received UI video assets to produce a video presentation stream suitable for use by a display device;

at a message proxy, in response to receiving user interaction data indicative of a local function, invoking an application programming interface (API) associated with said local function to select an appropriate channel of said video presentation stream.

* * * * *